(12) United States Patent
Sturza et al.

(10) Patent No.: US 10,882,455 B2
(45) Date of Patent: Jan. 5, 2021

(54) LOCKABLE INTERIOR STORAGE VOLUME WITHIN A PASSENGER COMPARTMENT OF A VEHICLE

(71) Applicants: Brian P Sturza, Washington, MI (US); Joseph V Rozenbaum, Ortonville, MI (US); Gerardo Alvino, Troy, MI (US)

(72) Inventors: Brian P Sturza, Washington, MI (US); Joseph V Rozenbaum, Ortonville, MI (US); Gerardo Alvino, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 1 day.

(21) Appl. No.: 16/385,645

(22) Filed: Apr. 16, 2019

(65) Prior Publication Data
US 2020/0331397 A1 Oct. 22, 2020

(51) Int. Cl.
*B60R 5/04* (2006.01)
*B60N 2/30* (2006.01)

(52) U.S. Cl.
CPC .............. *B60R 5/04* (2013.01); *B60N 2/3011* (2013.01)

(58) Field of Classification Search
CPC .... B60R 5/04; B60R 5/00; B60R 7/00; B60R 7/04; B60R 7/005
USPC ............................. 296/37.16, 66; 297/378.13
See application file for complete search history.

(56) References Cited

U.S. PATENT DOCUMENTS

| 4,813,722 | A * | 3/1989 | Viscome | B60N 2/366 292/216 |
|---|---|---|---|---|
| 7,281,742 | B2 * | 10/2007 | Porter, II | B60R 5/04 296/24.4 |
| 7,568,764 | B2 * | 8/2009 | Harper | B60N 2/045 297/14 |
| 7,611,200 | B2 * | 11/2009 | Jovicevic | B60N 2/2209 297/14 |
| 9,573,490 | B1 * | 2/2017 | Poniatowski | B60N 2/2245 |
| 9,616,778 | B1 * | 4/2017 | Bates | B60N 2/146 |
| 10,065,536 | B2 * | 9/2018 | Poniatowski | B60N 2/2245 |
| 10,377,271 | B2 * | 8/2019 | Bruck | B60N 2/0856 |
| 2006/0170236 | A1 * | 8/2006 | Porter, II | B60R 5/04 296/37.16 |
| 2009/0230745 | A1 * | 9/2009 | Jovicevic | B60N 2/2209 297/341 |
| 2014/0265499 | A1 * | 9/2014 | Pacolt | B60N 2/20 297/337 |
| 2017/0088020 | A1 * | 3/2017 | Poniatowski | B60N 2/43 |
| 2018/0001792 | A1 * | 1/2018 | Bruck | B60N 2/0856 |

FOREIGN PATENT DOCUMENTS

CA 2091223 A1 * 9/1994 ............... B60R 7/04

\* cited by examiner

*Primary Examiner* — Dennis H Pedder
(74) *Attorney, Agent, or Firm* — Ralph E Smith (57) ABSTRACT

A vehicle includes a passenger compartment having a rear wall, a first side wall, a second side wall and a floor. The vehicle further includes a seat having a seat back adjacent a rear wall of the passenger compartment. A storage volume is positioned between the seat, the rear wall, the first side wall and a second side wall and the floor. A securing mechanism selectively locks the seat back to the rear wall.

19 Claims, 12 Drawing Sheets

FIG. 10

LOCKABLE INTERIOR STORAGE VOLUME WITHIN A PASSENGER COMPARTMENT OF A VEHICLE

FIELD

The present disclosure relates to vehicle storage and, more particularly, to behind the seat storage area that is secured.

BACKGROUND

In a vehicle interior compartment, it is desirable to maximize storage. In order to optimize storage, designers utilize spaces in the entire compartment.

Some vehicles offer an open air experience. Removable or convertible tops may be provided. As well, removable doors are provided on some vehicles. Because the passenger compartment may be open, interior spaces are easily accessible from outside the vehicle. Securing belongings within the vehicle to prevent unauthorized removal is desirable.

SUMMARY

This section provides a general summary of the disclosures, and is not a comprehensive disclosure of its full scope or all of its features.

The present disclosure provides a securable storage volume behind a seat back.

According to one aspect of the present disclosure, a vehicle includes a passenger compartment having a rear wall, a first side wall, a second side wall and a floor. The vehicle further includes a seat having a seat back adjacent a rear wall of the passenger compartment. A storage volume is positioned between the seat, the rear wall, the first side wall and a second side wall and the floor. A securing mechanism selectively locks the seat back to the rear wall.

In another aspect of the disclosure, a vehicle includes a passenger compartment having a rear wall, a first side wall, a second side wall and a floor. A seat has a first seat back and a second seat back adjacent a rear wall of the passenger compartment. A storage volume is defined by the first seat back, the second seat back, the rear wall, the first side wall and a second side wall and the floor. A first securing mechanism selectively locks the first seat back to the rear wall. A second securing mechanism selectively locks the second seat back to the rear wall.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Examples will now be described more fully with reference to the accompanying drawings. Although the following description includes several examples of a pickup vehicle application, it is understood that the features herein may be applied to any appropriate vehicle. The examples disclosed below are not intended to be exhaustive or to limit the disclosure to the precise forms disclosed in the following detailed description. Rather, the examples are chosen and described so that others skilled in the art may utilize their teachings.

Figure 1A:
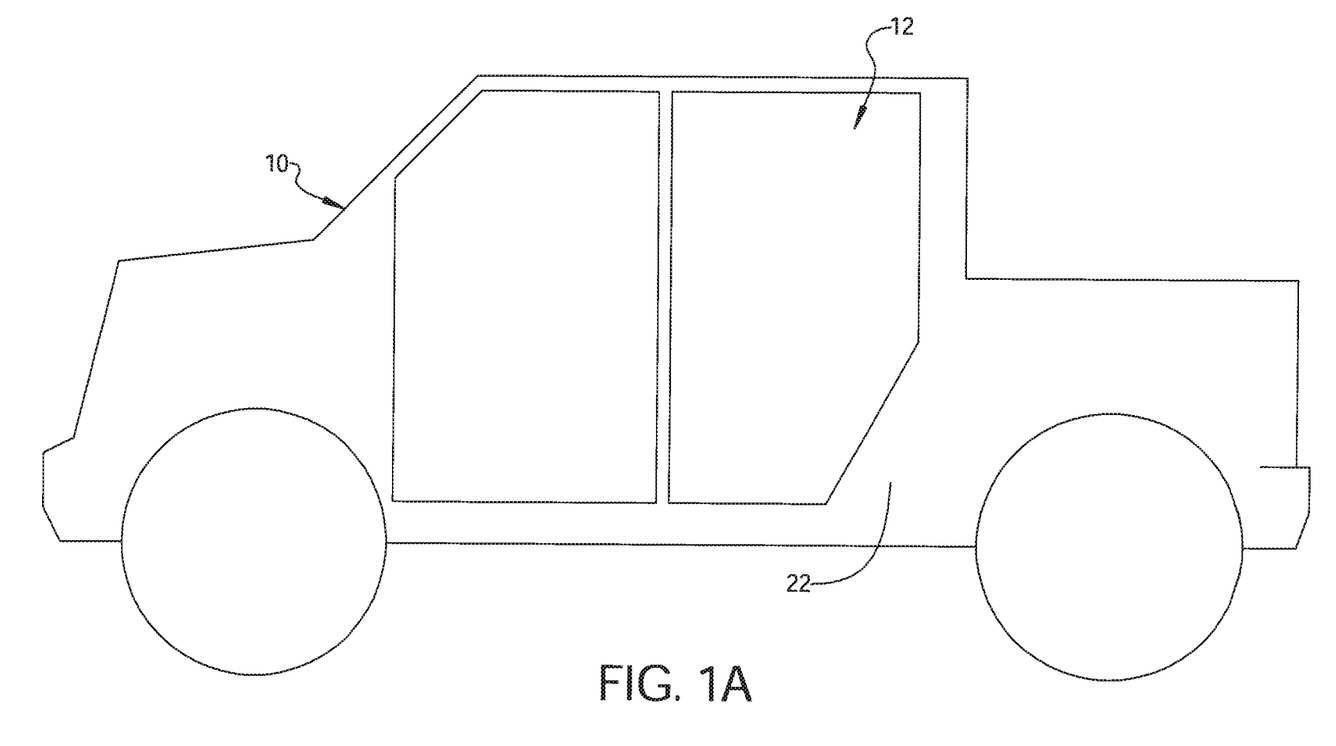
FIG. 1A is a side elevation view of a vehicle in accordance with the disclosure.
Figure 1B:
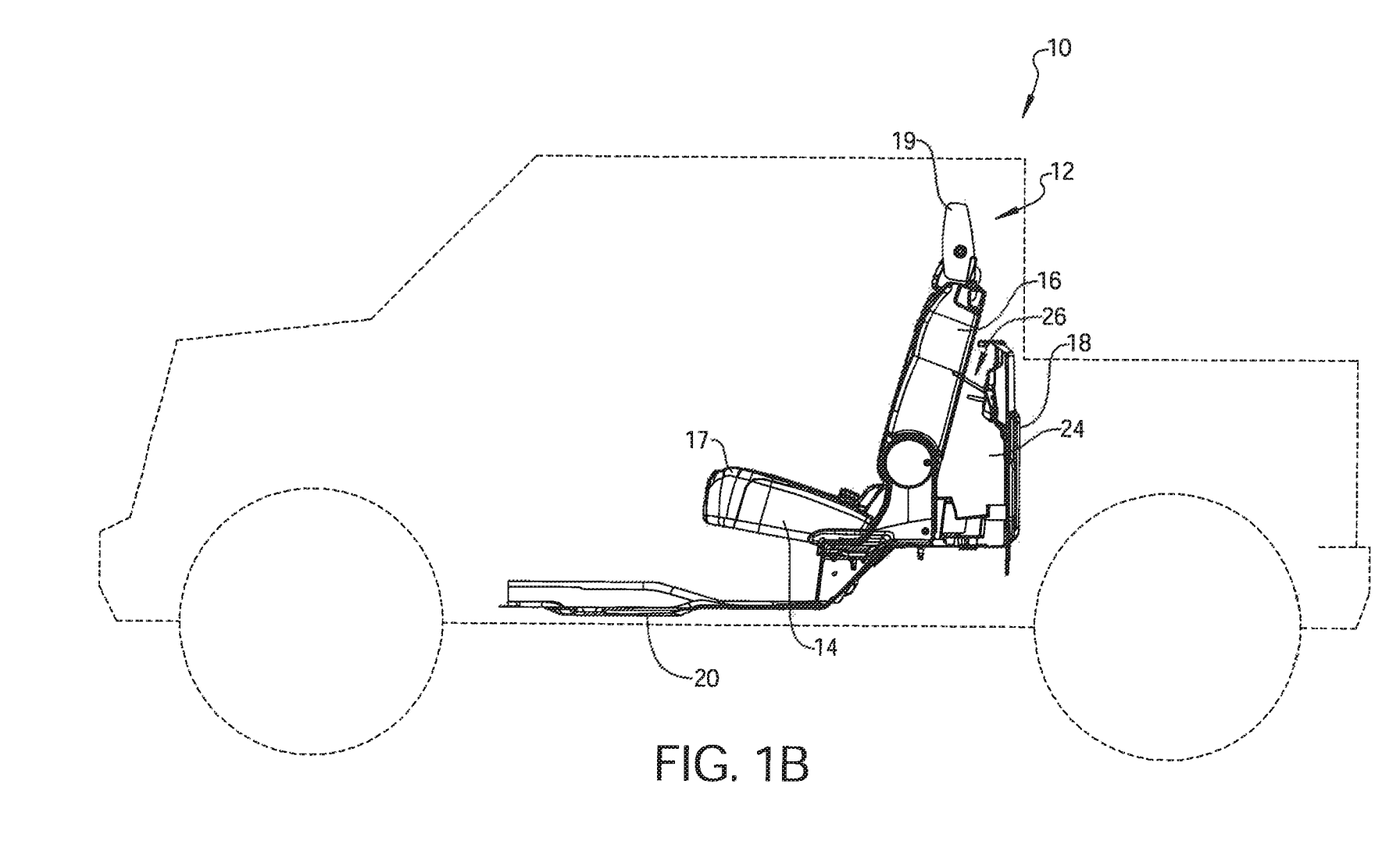
FIG. 1B is a cutaway view of a vehicle in accordance with the disclosure.

Referring now to FIGS. 1A and 1B, a vehicle 10 is illustrated. The vehicle 10 is illustrated as a light truck. However, the present disclosure is implemented in various types of automotive vehicles. The vehicle 10 includes an interior passenger compartment 12 having a seat 14 therein. The seat 14 has a retractable seat back 16 that is actuated as is set forth in further detail below. The seat 14 includes a seat base 17 and a headrest 19. Both the seat back 16 and the seat base 17 are foldable as set forth in greater detail below.

The passenger compartment 12 of vehicle 10 is partially defined by a rear wall 18, a floor 20 and opposite side walls 22. The seat 14 secured to the floor 20 such that the seat back 16 is adjacent the rear wall 18 of the interior passenger compartment 12. Outboard edges of the seat 14 are adjacent to the side walls 22.

A storage volume 24 is defined between the seat 14, the rear wall 18, the floor 20, and the side walls 22. As is described in further detail below, a securing mechanism 26 is used to secure the seat back 16 to the rear wall 18. The securing mechanism 26 includes a striker or securement member 28 that is coupled to the rear wall 18. The details of the securing mechanism 26 is described in further detail below, Accessing the storage volume 24 is achieved by moving the seat back 16 forward. Moving the seat back 16 forward is performed in different ways depending on the seat configuration.

Figure 2:
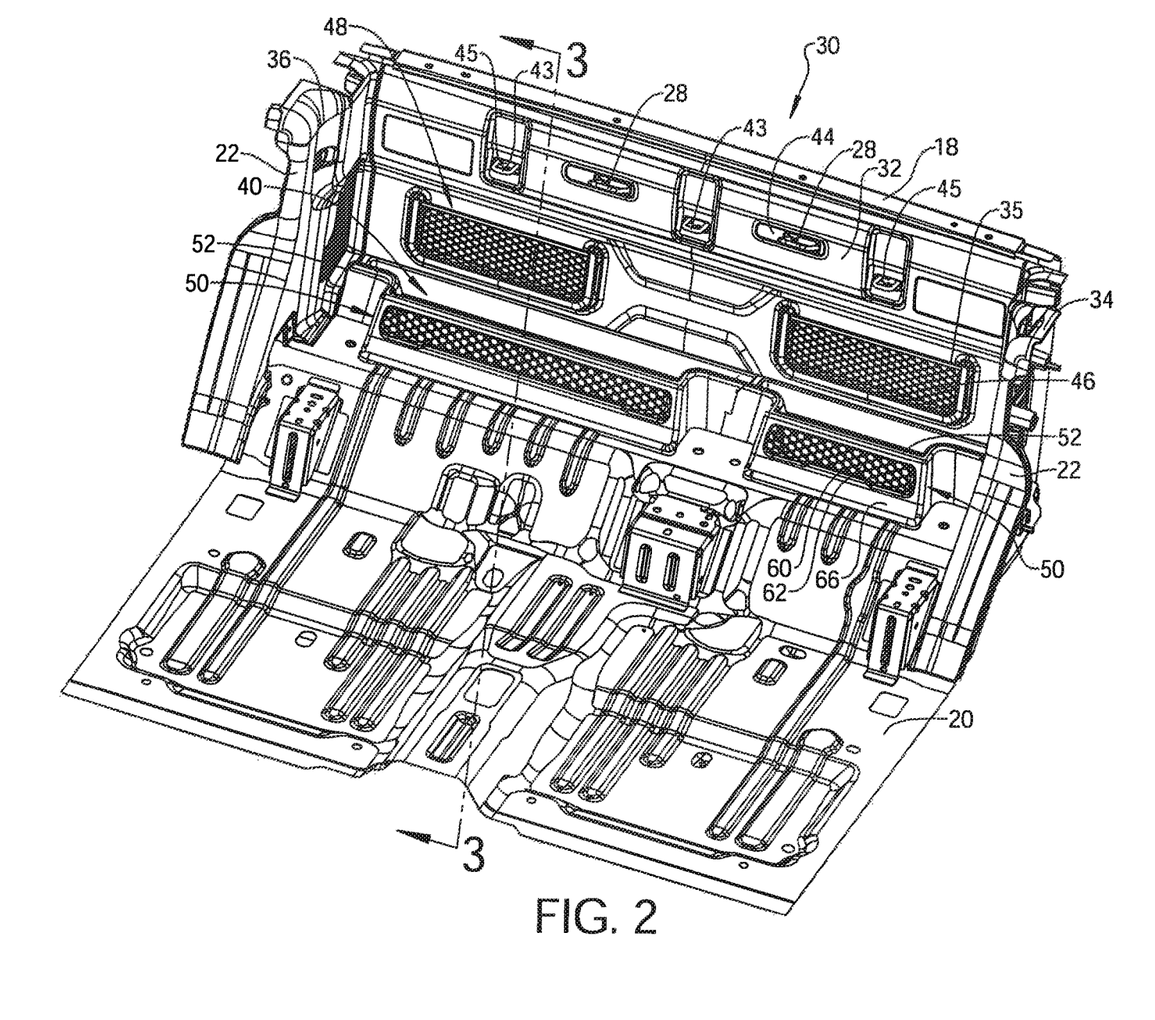
FIG. 2 is a perspective view of an interior compartment with the seat removed.
Figure 3:
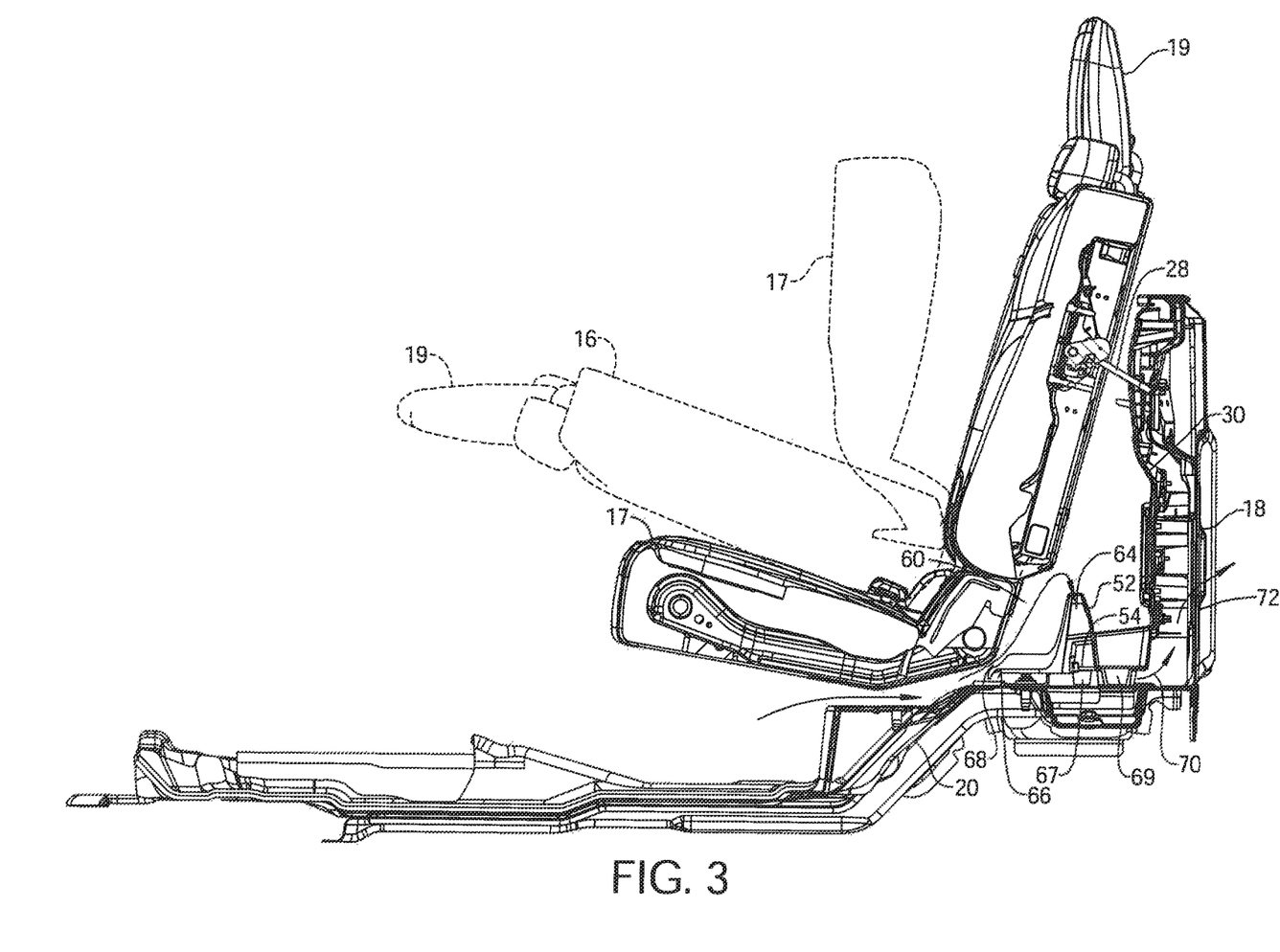
FIG. 3 is a cross-section view of FIG. 2 along line 3-3 with the seat in cross-section.

Referring now to FIGS. 2 and 3, an interior trim panel 30 is positioned behind the seat 14. The panel 30 is mounted to the rear wall 18. When the vehicle is equipped with the interior trim panel 30, the storage volume 24 is defined between the interior trim panel 30 and the seat back 16. The panel 30 includes a back 32 and sides 34, 36. The sides 34, 36 cover a portion of side walls 22 of the passenger compartment 12. Also, a storage tray or bin 40 is formed within the panel 30. The back 32 includes apertures 44 that enable passage of the securement members 28 that receive the seat back 16. Also, the back 32 includes at least one, illustrated as two recessed or indented portions 35. The indented portions 35 are opposed by a net 46 to provide additional storage containers 48 for the trim panel 30 within the storage volume 24. Further, alternate methods besides nets, such as storage bins, map pockets, or the like is formed from plastic and heat stake welded to the trim panel 30.

The storage tray or bin 40 includes at least one, illustrated with two, receiving portions 50. The receiving portions 50 are boxed shaped and are defined by a peripheral wall 52. The receiving portions 50 include a bottom floor or bottom 54 that defines the base of each storage receiving portion 50. The storage receiving portions 50 have an open top to enable items to be stored to be positioned into the receiving portions 50.

A wall such as a louvered wall 60 is formed in front of and with the receiving portion 50. The louvered wall 60 includes one or more windows 62. The windows 62 enable air to pass through the wall 60. The louvered wall 60 is spaced from the peripheral wall 52 to provide a gap 64 between the two. The louvered wall 60 is positioned on a desired angle with respect to the peripheral wall 52. The louvered wall 60 includes a flange 66 with a downturn end 68. The flange 66 provides a step and enables the downturn ends 68 to be positioned against the floor 20 of the vehicle. The flange 66 increases rigidity and creates a bite into carpet or floor covering on the floor 20. The receiving portion bottom 54 is positioned in a plane above the plane of the floor 20 that is contacted by the downturn end 68. The stand offs 67, 69 on the bottom of the storage receiving portion 50 create the air flow path gap 70 on the bottom underside. This enables airflow through the louvered wall 60 and under the bottom 54. Thus, the flow path gap 70 is created between the underside of the bottom 54 and the surface of the floor 20. This enables the air to pass under the bottom 54 to rear wall 18.

The louvered wall 60 creates a blockade to secure items stored in the receiving portion 50 from theft. The louvered wall 60 blocks access to the items in the receiving portion 50 when the seat 14 is in the stowed or the up position.

The rear wall 18 includes a vent 72 to enable the air within the interior passenger compartment 12 to pass and exit the vehicle. The flow path gap 70 between the bottom 54 and the floor 20 is sized so that air in the compartment readily exits the vent 72 to enhance the closing of the vehicle doors. It has been found that a gap from 15 to 30 mm provides such a feature.

As is be seen best in FIG. 3, air flows through the windows 62 and under the bottom 54 and then up along the back 32 to exit the vent 72. This tortuous path provides desired airflow characteristics.

Figure 4:
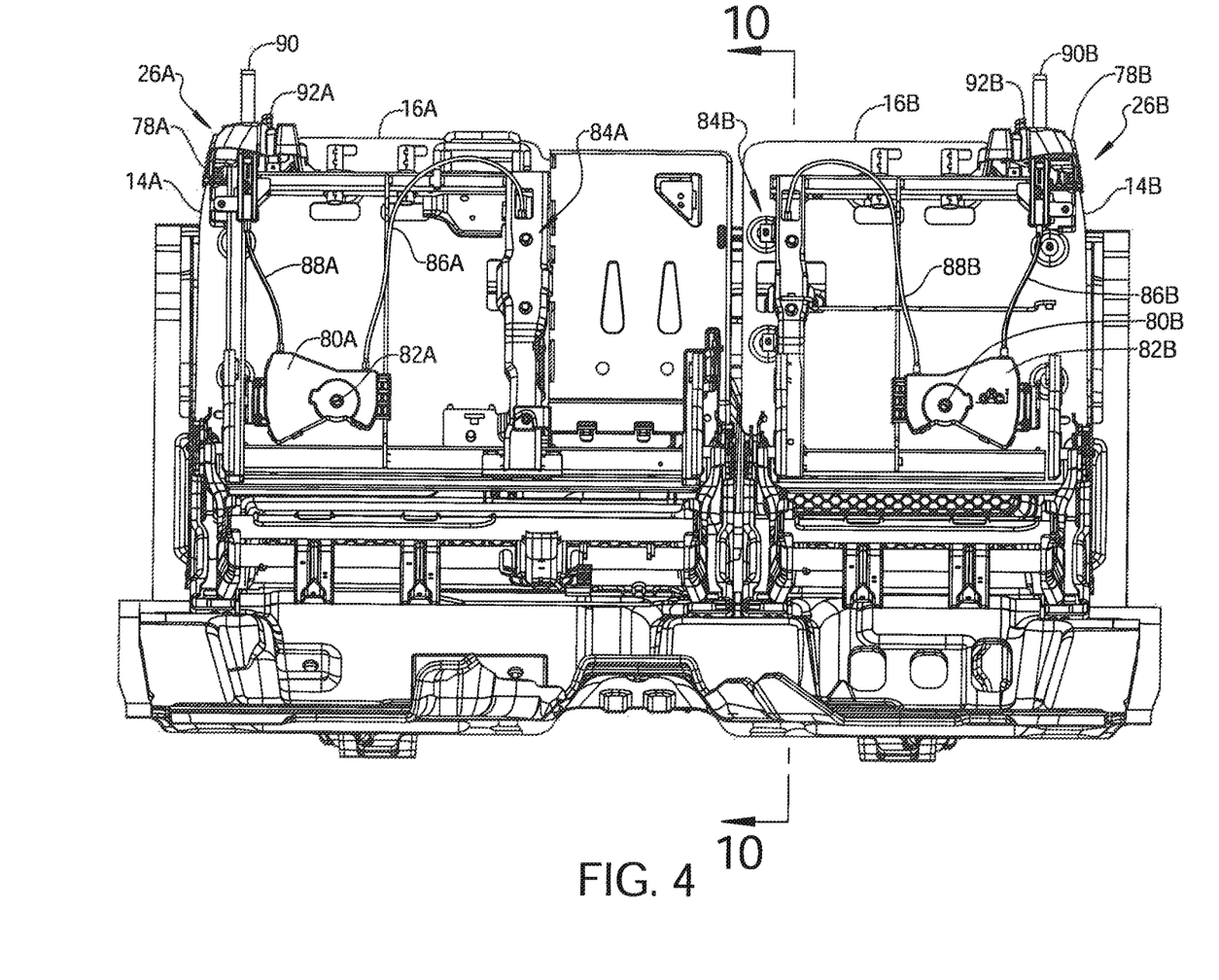
FIG. 4 is a cutaway front view of a seat used forming the storage area.

Referring now to FIG. 4, the seat 14 is illustrated as two separate seat portions 14A and 14B. Each seat is independently actuatable and securable. The seat 14A includes two seating positions at the passenger side and the middle, while the seat 14B includes a single passenger on the driver side of the vehicle. The seat 14 with seat portions 14A, 14B is referred to as a 60/40 seat. In other examples, the seat 14 is one continuous seat or 3 or more independent seat portions, each of which has securing mechanisms. FIG. 4 shows a cutaway with the securing mechanisms 26A, 26B for latching and locking the seat backs 16A, 16B. In this example, each seat has a respective locking mechanism 78A, 78B that is used to control a respective pivot mechanism 80A, 80B that has a respective axis 82A, 82B. Each pivot mechanism 80A, 80B is in communication with a respective latching mechanism 84A, 84B. First cables 86A, 86B couple the locking mechanisms 78A, 78B to the pivot mechanism 80A, 80B. A cable 88A, 88B couples the respective pivot mechanism 80A, 80B to the latching mechanism 84A, 84B.

Referring now to FIGS. 5-9, the securing mechanism 26 will be illustrated in further detail. In this example, the securing mechanism 26A and 26B is configured in the exact same manner. Likewise, the latching and locking mechanisms are identical mirror images of each other and are thus only described once. The securing mechanism 26 includes a release handle 90 such as a pull strap. The handle 90 is in communication with the cable 88. That is, when the handle 90 is pulled outward from the seat 14, the cable 88 moves which allows the pivot mechanism 80 to pull in an upward direction. This in turn pulls cable 88 so that the latching mechanism 84 unlatches as will be described in more detail below.

Figure 5:
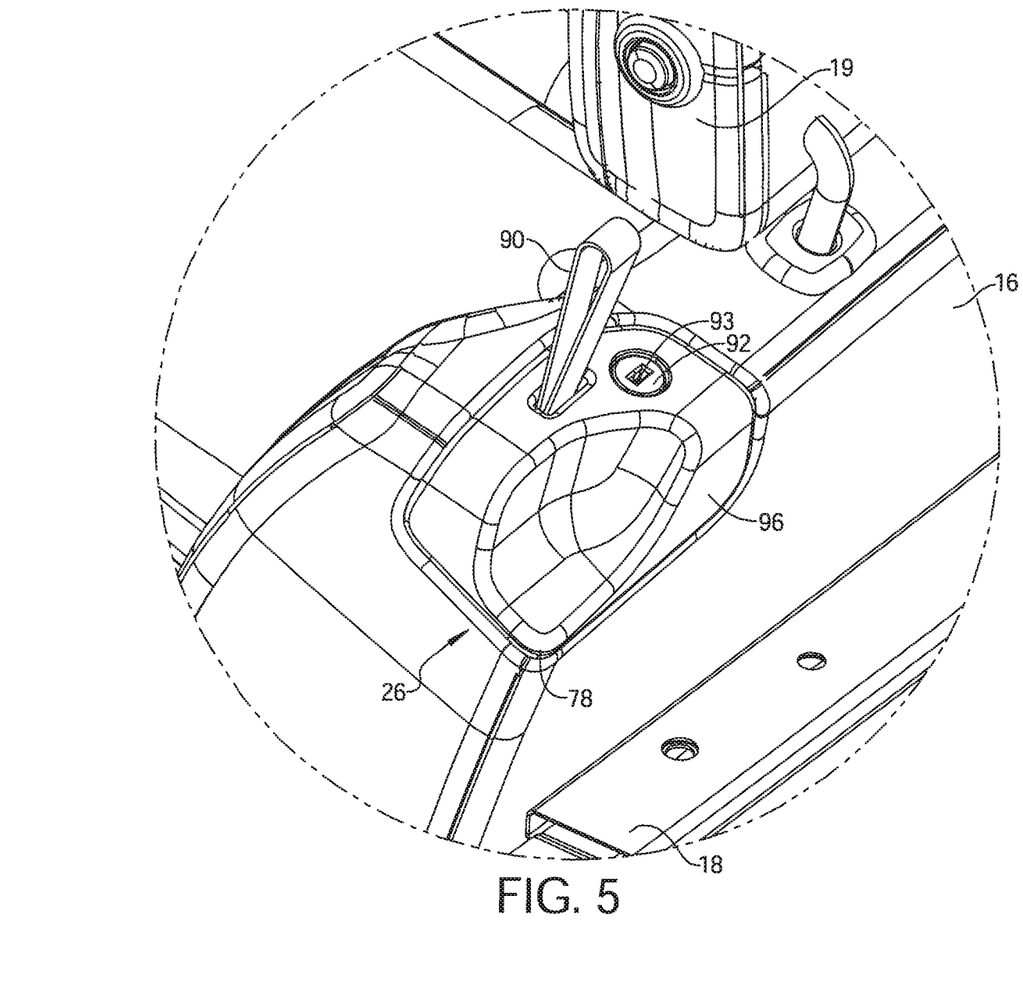
FIG. 5 is an enlarged perspective view of the locking mechanism.
Figure 6:
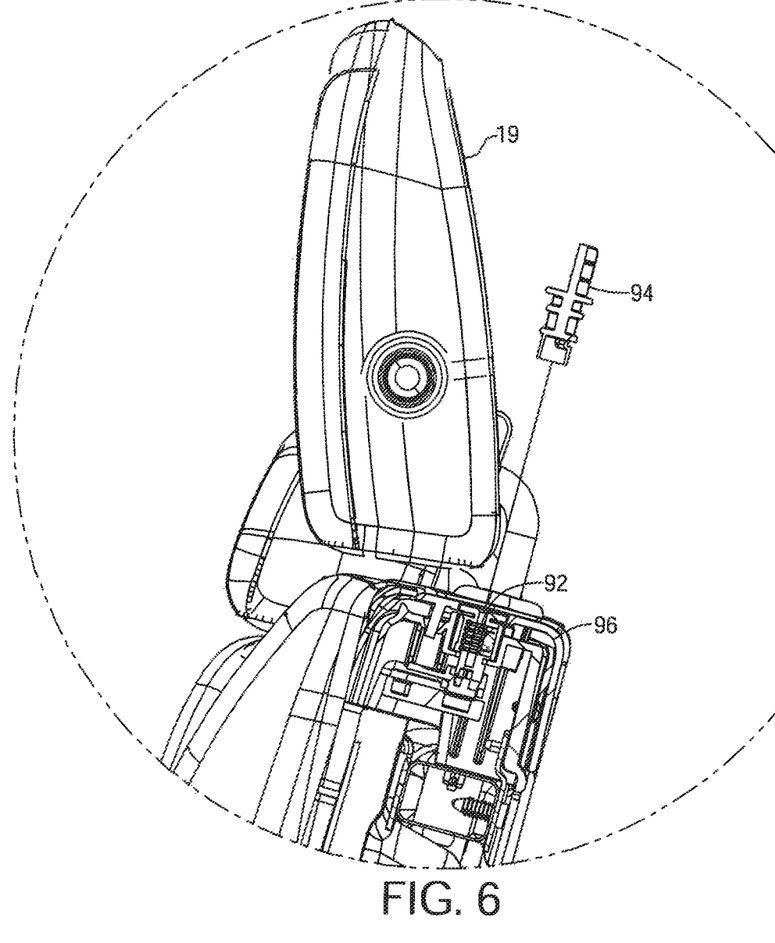
FIG. 6 is a side cutaway view of the seat and the lock of the locking mechanism.

The securing mechanism 26 also includes a lock 92. The lock 92 is illustrated as a key lock with a key opening 93 in an unlocked position. However, a locked position is formed with the key opening 93 in a different orientation (such as displayed ninety degrees). As is best shown in FIG. 6, the lock 92 is replaced by a plug 94 during shipping of the seat. Typically, seats are manufactured at a different location. The lock 92 is provided to manufacturing facility and replaces the plug 94. Typically, the plug 94 prevents debris from being lodged into the position for the lock 92. A trim piece 96 is used at the outboard corner of the seat 14 to accommodate the handle 90 and the lock 92.

Figure 7:
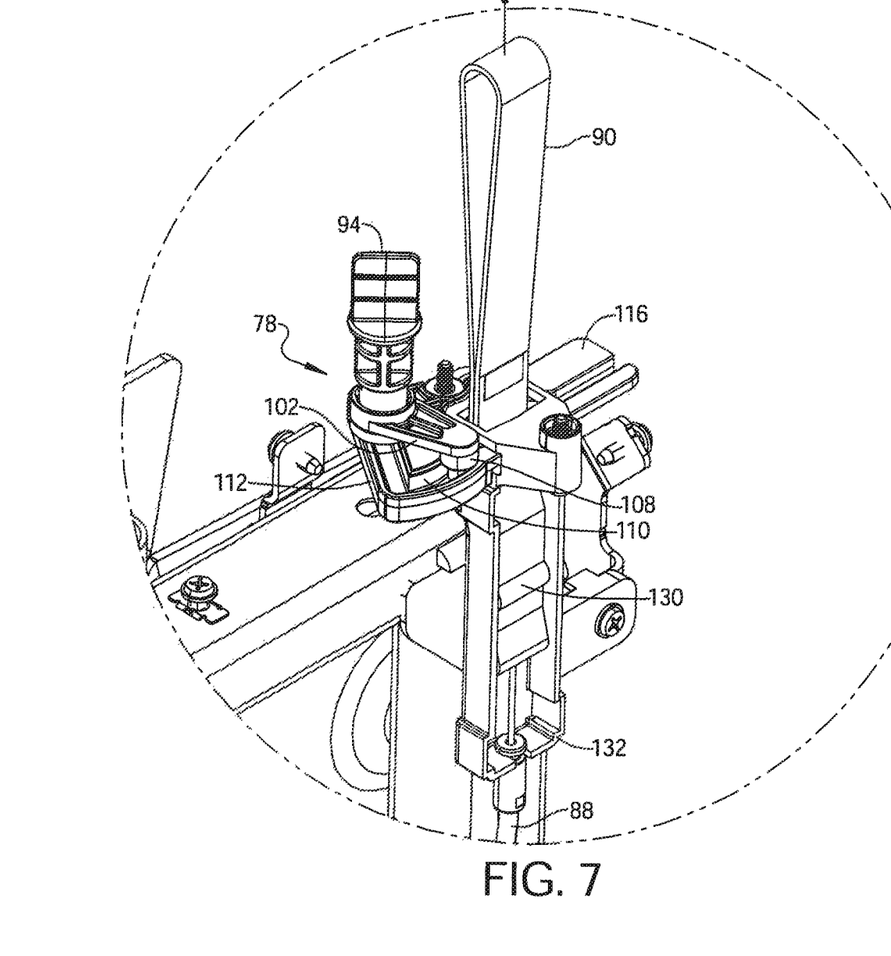
FIG. 7 is a cutaway view of the locking mechanism.
Figure 8:
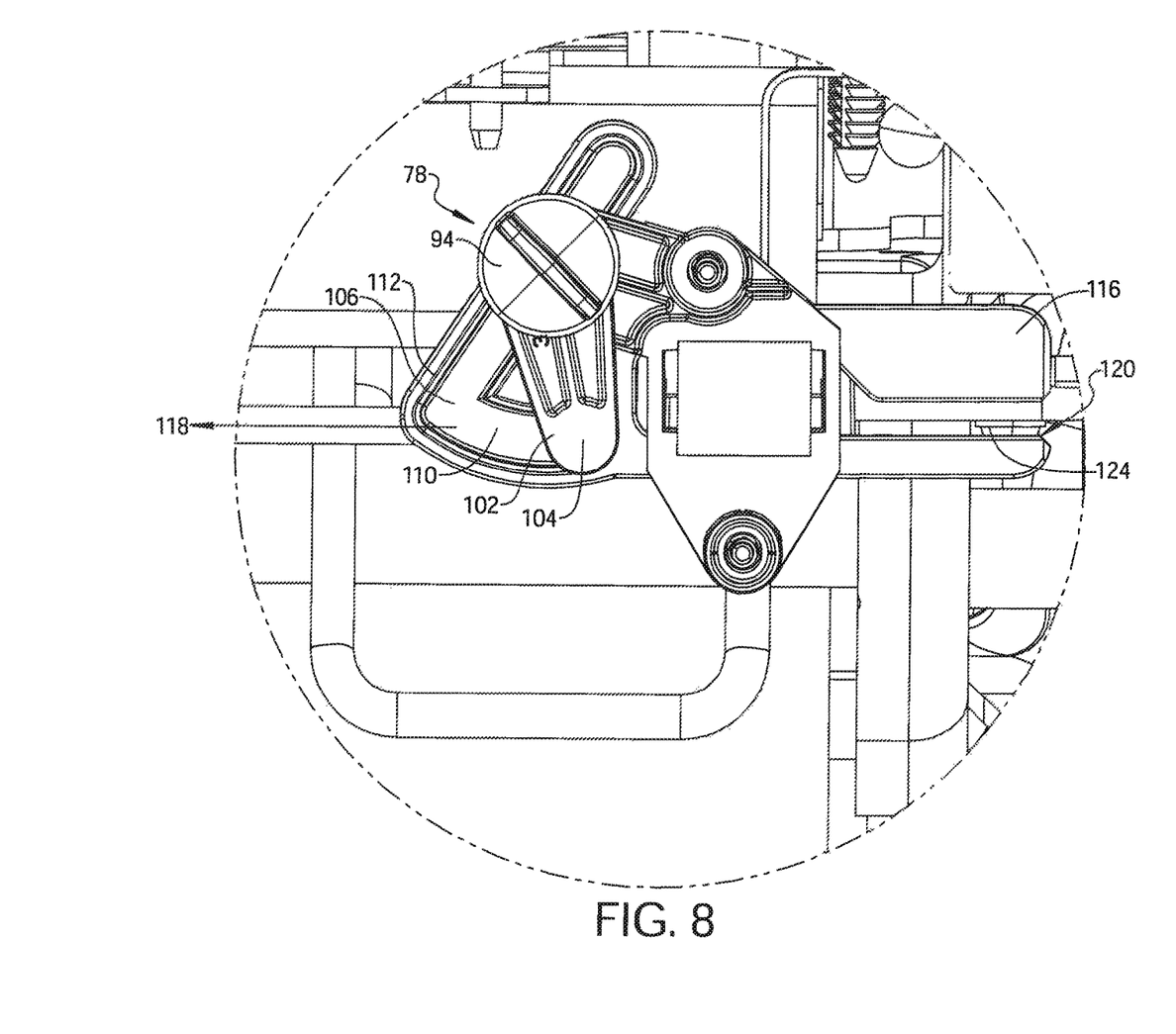
FIG. 8 is a top view of the locking mechanism of FIG. 7.
Figure 9:
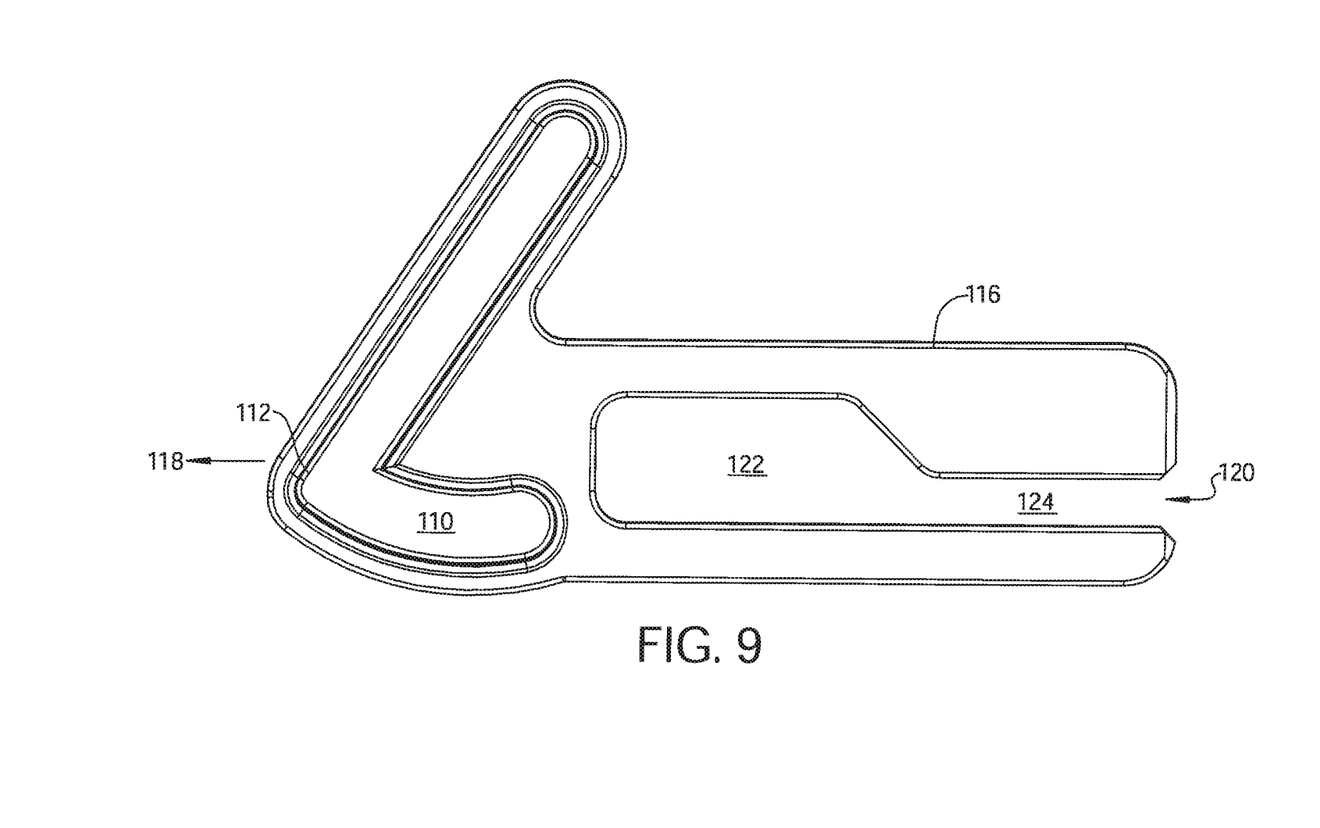
FIG. 9 is a top view of the engagement member of the locking mechanism.

Referring now specifically to FIGS. 7, 8 and 9, details of the locking mechanism 78 are set forth. In this example, the lock 92 and the handle 90 is also incorporated within the locking mechanism 78. The locking mechanism 78 is illustrated with the plug 94 therein. Thus, the locking mechanism 78 is in a shipping mode. As mentioned above, the lock 92 replaces the plug 94 during manufacturing. The locking mechanism 78 includes a first arm 102 which is illustrated in a first position corresponding to an unlocked position 104. The first arm 102 is also be positioned in a locked position 106.

The first arm 102 includes a pin 108 extending therefrom. The pin 108 moves between the unlocked position 104 and the locked position 106 depending upon the position of the plug 94 or the lock 92 therein. The pin 108 is received in a channel 110. In the locked position 106, the pin 108 pushes against the wall 112 of the channel 110 to move an engagement member 116 in a direction illustrated by the arrow 118. The engagement member 116 is illustrated in the unlocked position 104. That is, the engagement member 116 has an engagement channel 120 that has a wide portion 122 and a narrow portion 124. The wide portion 122 corresponds to the unlocked position 104 and the narrow portion 124 corresponds to the locked position 106. The wide portion 122 allows the handle 90 to be pulled outward to actuate the pivot mechanism 80 and thus the latching mechanism 84. An engagement tang 130 moves upward and downward with the handle 90. The engagement tang 130 is prevented from moving beyond the seat back through engagement with the narrow portion 124. When the seat is an unlocked position the engagement tang 130 does not engage the wide portion 122 of the engagement channel 120. In the locked position 106 the engagement tang 130 is prevented from moving beyond the engagement channel 120 by the narrow portion 124. In FIG. 7 the engagement member 116 is moved leftward to the locked position 106 by the first arm 102 which engages the channel 110 and moves the pin 108 against the wall 112. The movement of the first arm 102 is performed by moving the lock 92 from a first position to a second position. Of course, as illustrated, the plug 94 is moved from a first position to a second position to engage the locking aspect of the engagement member 116. A cable holder 132 holds the cable 88 relative to the handle 90.

Figure 10:
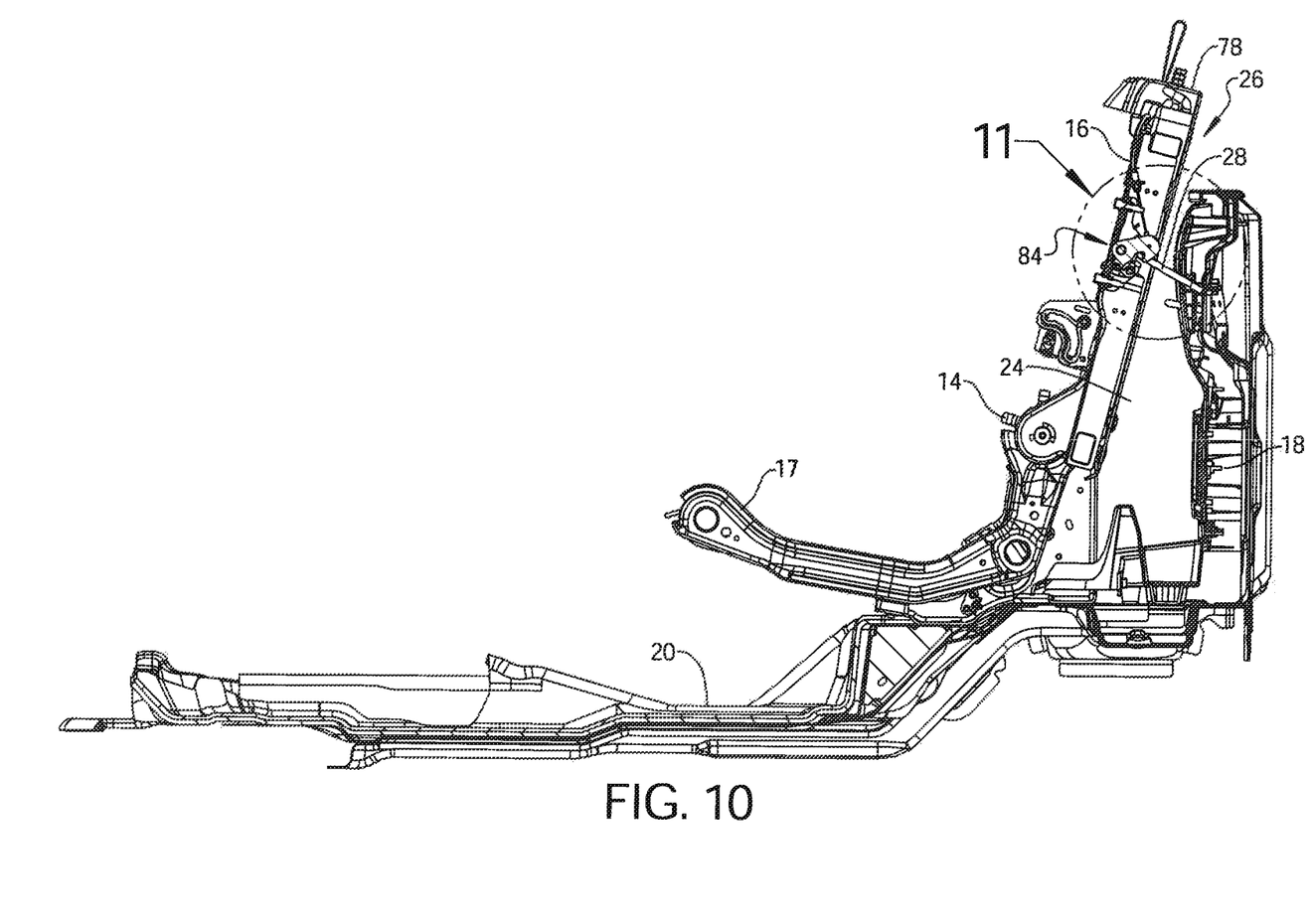
FIG. 10 is a cutaway view of the seat showing the latching mechanism.
Figure 11:
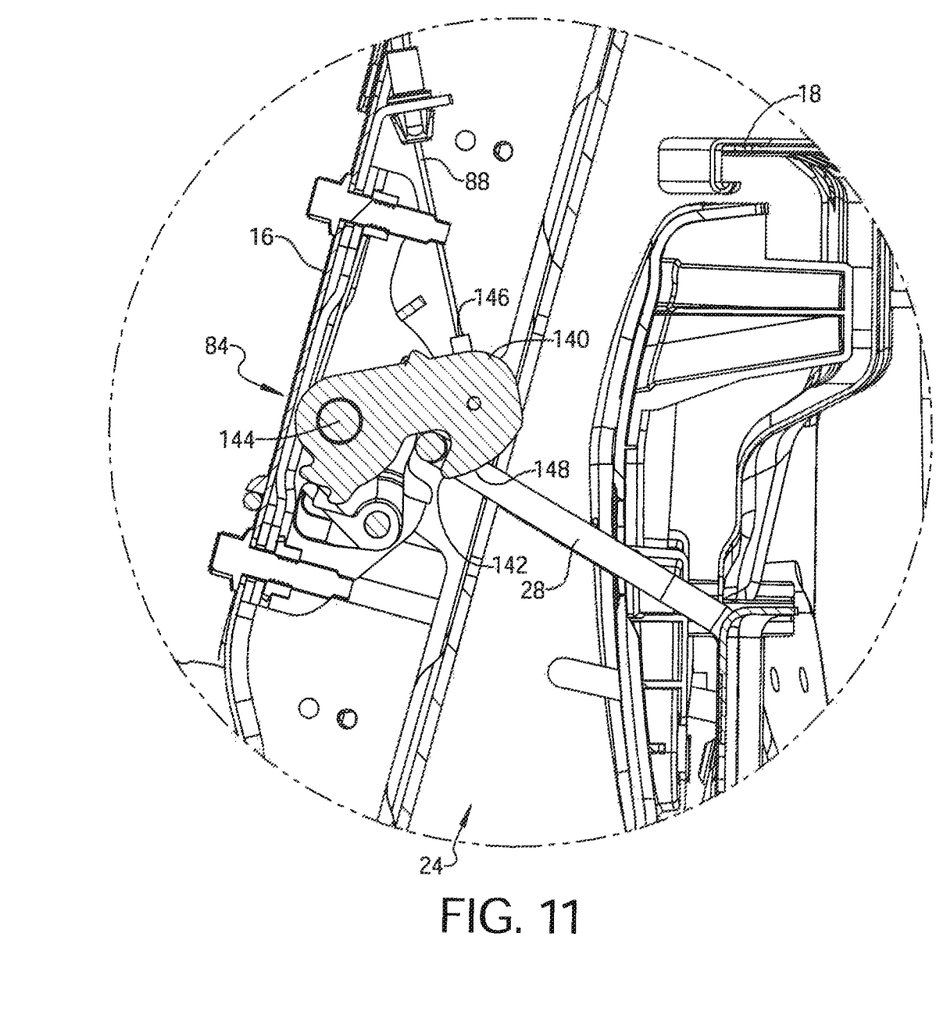
FIG. 11 is an enlarged view of the latching mechanism.

Referring now to FIGS. 10 and 11, the latching mechanism 84 is illustrated in further detail. The latching mechanism 84 is used to engage and disengage from the securement member 28. When disengaged the seat back 16 is folded forward to access the storage volume 24. The latching mechanism 84 includes a latch 140 that includes an engagement tab 142. The engagement tab 142 is used for engaging the securement member 28. The latch 140 is rotatably mounted within the seat back 16 at a pivot point 144. Cable 88 is mounted to a cable mount 146 which when the cable 88 is pulled in an upward direction from pulling the handle 90 in an upward direction rotates the latch 140 about the pivot point 144 to disengage the engagement tab 142 from the securement member 28. To reengage the latch 140, the seat back 16 is placed into its rearmost position where in an outer surface 148 of the latch 140 pushes against the securement member 28 to push the latch upward and over the securement member 28 so that the engagement tab 142 prevents the seat back 16 from moving into a forward or rotated position.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a passenger compartment having a rear wall, a first side wall, a second side wall and a floor;
   a seat having a seat back adjacent a rear wall of the passenger compartment;
   a storage volume positioned between the seat, the rear wall, the first side wall and a second side wall and the floor; and
   a securing mechanism selectively locking the seat back to the rear wall,
   wherein the securing mechanism includes a securement member disposed on the rear wall, a latching mechanism coupled to the seat and configured to be selectively coupled to the securement member, and a locking mechanism including a release handle coupled to the latch, and
   wherein the locking mechanism includes a lock selectively preventing the release handle from moving.

2. The vehicle of claim 1 wherein the securement member comprises a striker fixedly coupled to the rear wall.

3. The vehicle of claim 1 wherein the latching mechanism is disposed within the seat back.

4. The vehicle of claim 3 wherein the latching mechanism comprises a latch disposed inboard relative to a seat edge.

5. The vehicle of claim 1 wherein the release handle comprises a strap coupled to a pivot mechanism by a cable.

6. The vehicle of claim 1 wherein the lock comprises a key lock.

7. The vehicle of claim 6 wherein the key lock moves an engagement member to engage a tang of the release handle.

8. The vehicle of claim 7 wherein the engagement member comprises an engagement channel having a wide portion adjacent to the release handle in an unlocked position and a narrow portion adjacent to the release handle in a locked position.

9. The vehicle in claim 8 wherein the engagement member comprises a second channel receiving a pin coupled to the lock.

10. The vehicle of claim 9 further comprising a pivot mechanism coupling the latching mechanism to the locking mechanism.

11. The vehicle of claim 1 further comprising a storage container mounted to the rear wall within the storage volume.

12. A vehicle comprising:
    a passenger compartment having a rear wall, a first side wall, a second side wall and a floor;
    a seat having a first seat back and a second seat back adjacent a rear wall of the passenger compartment;
    a storage volume defined by the first seat back, the second seat back, the rear wall, the first side wall and a second side wall and the floor;
    a first securing mechanism selectively locking the first seat back to the rear wall; and
    a second securing mechanism selectively locking the second seat back to the rear wall,
    wherein the first securing mechanism comprises a first latching mechanism disposed within the first seat back and the second securing mechanism comprises a second latching mechanism are disposed within second seat back,
    the first securing mechanism comprises a first locking mechanism comprising a first release handle coupled to the first latching mechanism and the second securing mechanism comprises a second locking mechanism comprising a second release handle coupled to the second latching mechanism, and
    wherein the first release handle comprises a first strap having a first tang engaging a first narrow portion of a first engagement member and wherein the second release handle comprises a second strap having a second tang engaging a second narrow portion of a second engagement member.

13. The vehicle of claim 12 wherein the first locking mechanism comprises a first lock and the second locking mechanism comprises a second lock.

14. The vehicle of claim 12 wherein the first locking mechanism is coupled to the first latching mechanism through a first pivot mechanism mounted within the seat back and the second locking mechanism is coupled to the second latching mechanism through a second pivot mechanism mounted within the seat back.

15. A vehicle comprising:
    a passenger compartment having a rear wall, a first side wall, a second side wall and a floor;
    a seat having a seat back adjacent a rear wall of the passenger compartment;
    a storage volume positioned between the seat, the rear wall, the first side wall and a second side wall and the floor; and
    a securing mechanism selectively locking the seat back to the rear wall,
    wherein the securing mechanism comprises a securement member disposed on the rear wall, a latching mechanism coupled to the seat and that is configured to be selectively coupled to the securement member, and a locking mechanism connected to the latching mechanism that selectively allows and prevents the latching mechanism from being coupled to the securement member, the locking mechanism is configured to move an engagement member between a locked position and an unlocked position, the engagement member has an engagement channel configured for receipt of a release handle that is configured to actuate the latching mechanism, the engagement channel includes a wide portion and a narrow portion, the release handle being located in the wide portion when the engagement member is in the unlocked position, and the release handle being located in the narrow portion when the engagement member is in the locked position, and the engagement member is moved between the locked position and the unlocked position by the locking mechanism such that the release handle is prevented from actuating the latching mechanism when the release handle is located in the narrow portion of the engagement channel.

16. The vehicle of claim 15 wherein the release handle comprises a strap coupled to a pivot mechanism by a cable.

17. The vehicle in claim 15 wherein the engagement member comprises a second channel configured for receipt of a pin coupled to the locking mechanism.

18. The vehicle of claim 15 further comprising a pivot mechanism coupling the latching mechanism to the locking mechanism.

19. The vehicle of claim 15 further comprising a storage container mounted to the rear wall within the storage volume.

* * * * *